US009148351B2

(12) United States Patent
Yuan et al.

(10) Patent No.: US 9,148,351 B2
(45) Date of Patent: Sep. 29, 2015

(54) SYSTEMS AND METHODS TO HANDLE CODEC CHANGES IN CALL QUALITY CALCULATIONS

(71) Applicant: Tektronix, Inc., Beaverton, OR (US)

(72) Inventors: Nancy Yuan, Carrollton, TX (US); Quenie Q. Sun, Allen, TX (US); Alison Cohen, Plano, TX (US); Michael Campbell, Frisco, TX (US)

(73) Assignee: Tektronix, Inc., Beaverton, OR (US)

( * ) Notice: Subject to any disclaimer, the term of this patent is extended or adjusted under 35 U.S.C. 154(b) by 162 days.

(21) Appl. No.: 13/942,129

(22) Filed: Jul. 15, 2013

(65) Prior Publication Data

US 2015/0016285 A1 Jan. 15, 2015

(51) Int. Cl.
*H04L 12/24* (2006.01)
*H04L 29/06* (2006.01)

(52) U.S. Cl.
CPC ........ *H04L 41/5009* (2013.01); *H04L 41/5067* (2013.01); *H04L 65/00* (2013.01)

(58) Field of Classification Search
CPC ... H04L 43/08; H04L 29/06027; H04L 65/80; H04M 7/006; H04M 3/2236
See application file for complete search history.

(56) References Cited

U.S. PATENT DOCUMENTS

| | | | | |
|---|---|---|---|---|
| 7,002,992 B1 * | 2/2006 | Shaffer et al. | ................. | 370/468 |
| 8,059,634 B1 * | 11/2011 | Evans | ............................ | 370/356 |
| 8,559,320 B2 * | 10/2013 | Khanduri | ...................... | 370/252 |
| 2007/0008899 A1 * | 1/2007 | Shim et al. | .................... | 370/252 |
| 2007/0053303 A1 * | 3/2007 | Kryuchkov | ................... | 370/250 |
| 2013/0055331 A1 * | 2/2013 | Karacali-Akyamac | ....... | 725/116 |
| 2013/0155866 A1 * | 6/2013 | Sun et al. | ..................... | 370/241 |

FOREIGN PATENT DOCUMENTS

WO    WO 2007127481 A2 * 11/2007

* cited by examiner

*Primary Examiner* — Jung Park
*Assistant Examiner* — Chuong M Nguyen
(74) *Attorney, Agent, or Firm* — Locke Lord LLP; Scott D. Wofsy; Christopher J. Capelli

(57) ABSTRACT

The embodiments described herein relate to obtaining one or more measurements from a VOIP communication that is indicative of call quality, changing one or more settings of the VOIP communication, such as the type of codec or the ascribed bit rate of a VBR codec, and determining call quality of the VOIP communication after setting changes by utilizing at least one of the one or more call quality measurements.

13 Claims, 5 Drawing Sheets

SYSTEMS AND METHODS TO HANDLE CODEC CHANGES IN CALL QUALITY CALCULATIONS

FIELD OF THE INVENTION

The present invention relates to monitoring quality of audio communications, and more particularly, to monitoring call quality of audio communication that accounts for mid-call codec changes.

BACKGROUND OF THE INVENTION

Packet-based networks, in particular, Voice Over IP (VOIP) networks, are rapidly emerging as a viable alternative to traditional telephony (that is, circuit switched networks). VOIP is viewed as an attractive option for voice transport in that it allows live voice conversations to be integrated with existing IP data and image applications. To be a truly competitive alternative, VOIP must emulate the performance of traditional telephony and do so using a protocol that was optimized for data traffic. The characteristics of data traffic are quite different from those of voice traffic, however.

Unlike data traffic, voice traffic is extremely intolerant of delay and delay variation (or "jitter"), as well as packet loss. Much work has been done in the area of packet delivery to provide end-to-end Quality of Service (QoS). Service level agreements (SLAs) for VOIP, like those for conventional data IP networks, therefore tend to be based on conventional data network metrics, that is, guaranteed service levels are expressed solely in terms of packet level performance, e.g., packet loss, delay, jitter.

Another important aspect of voice communications quality that is not reflected in the data network metrics, however, relates to the sound of a voice call from the perspective of the listener. Standardized techniques exist for measuring this aspect of voice quality. Typically, to support voice communications, VOIP networks encode the audio and format the encoded audio into packets for transport using an IP protocol. Consequently, the results of these voice quality tests are greatly affected by choice of coding techniques.

One approach utilizes a standardized ranking system called the Mean Opinion Score (MOS). The MOS system uses a five-point scale: excellent (5); good (4); fair (3); poor (2); and bad (1) wherein a level of quality indicated by a score of 4 is considered to be comparable to "toll quality".

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages, and in accordance with the purpose of the illustrated embodiments, in one aspect, described is a system and method for determining call quality for a VOIP communication after occurrence of VOIP communication setting changes. The system and method includes obtaining one or more measurements from a VOIP communication that is indicative of call quality. One or more settings of the VOIP communication are changed subsequent to obtaining the one or more call quality measurements. The call quality of the VOIP communication is determined after occurrence of the setting changes by utilizing at least one of the one or more call quality measurements.

Determining the VOIP call quality may preferably include utilizing an Ie-eff value of the VOIP communication that was obtained prior to the changing of one or more settings to determine an $I_{e\text{-}eff}$ value for the VOIP communication after the changing of the one or more settings. Changing the one or more settings of the VOIP communication may include changing at least one of a codec utilized for the VOIP communication and a bit rate of a Variable Bit Rate (VBR) codec utilized for the VOIP communication.

In certain illustrated embodiments of the invention, when data communication of the VOIP communication transitions from a burst to a gap, a first $I_{(burst)}$ value is determined for a segment prior to the burst to gap transition and an $I_{(burst \to gap)}$ value is determined for the burst to a gap transition. And when data communication of the VOIP communication transitions from a gap to a burst, a second $I_{(burst)}$ value is determined for the segment prior to the gap to burst transition and an $I_{(gap \to burst)}$ value is determined for the gap to burst transition. Thus, it is to be appreciated the VOIP call quality is then determined by utilizing a time-weighted average for each of the first and second calculated $I_{(burst)}$ values and the calculated $I_{(burst \to gap)}$ and $I_{(gap \to burst)}$ values upon termination of a VOIP communication.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

DETAILED DESCRIPTION OF CERTAIN EMBODIMENTS

Figure 1:
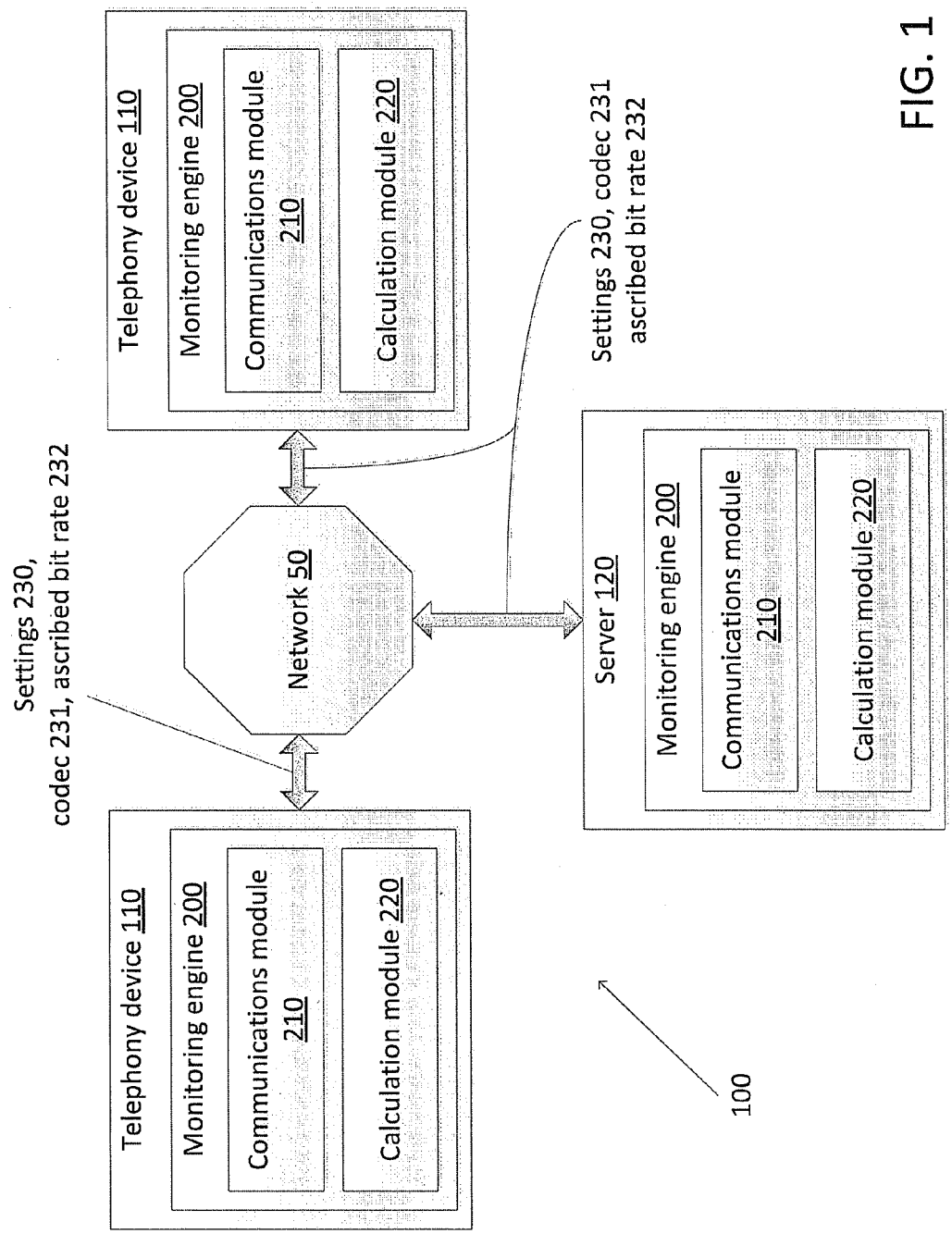
FIG. 1 illustrates a system diagram of an exemplary use of an embodiment of a system for handling changes to the codec and/or the settings when calculating VOIP call quality.

The below illustrated embodiments are directed to systems and methods for handling mid-call codec or settings changes when calculating the quality of VOIP calls in which a component or a feature that is common to more than one illustration is indicated with a common reference. It is to be appreciated the below illustrated embodiments are not limited in any way to what is shown, as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the certain illustrated embodiments. Furthermore, the terms and phrases used herein are not intended to be limiting but rather to provide an understandable description of the certain illustrated embodiments.

Unless defined otherwise, all technical and scientific terms used herein have the same meaning as commonly understood by one of ordinary skill in the art relating to the below illustrated embodiments. Although any methods and materials similar or equivalent to those described herein can also be used in the practice or testing of the below illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the certain embodiments described herein are preferably utilized in conjunction with a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described herein. One skilled in the art will appreciate further features and advantages of the certain embodiments described herein thus the certain illustrated embodiments are not to be understood to be limited by what has been particularly shown and described, except as indicated by the appended claims.

As will be appreciated from the below description of certain illustrated embodiments, the methods described herein provide a means to quantify the quality of VOIP communications over a network, even if the communications incorporate modifications to the codec and/or the ascribed bit rate in the VOIP communication.

In one example, a Voice Over IP (VOIP) call is initiated between two or more devices. The VOIP call preferably utilizes a codec to minimize bandwidth requirements for the network(s). Communications over networks, and particularly over the internet, will commonly experience interruptions or delays. These interruptions may be referred to as a "burst" of packets (e.g., a TCP/IP packet) being dropped and/or late. When the network is performing without problems, there will be "gaps" of no, or very few, packets being dropped or late. Thus, a typical VOIP call, or other communication over computer networks, will commonly experience bursts and gaps regarding the rate of communications.

It is common practice to use codecs with VOIP calls. Codec encode, or compress, the data to be communicated over the network, thus reducing the likelihood of individual packets arriving late or never. When the data arrives at the destination, the same codec is preferably used to decode, or decompress, the data.

Different codecs compress the data to different ratios. Generally speaking, the more a codec compresses the data, the lower the quality of the sound/video being communicated, but the greater the chance the communication arrives on time. The contrapositive observation is that, the less a codec compresses the data, the higher the quality of the sound/video being communicated, but the greater the chance the communication arrives late or never.

Over the course of a typical VOIP call, if a device in a VOIP call detects that more packets are being dropped, the device may compensate by initiating the use of a different codec that compresses the data more. Thus, the communication data, being smaller, may have a greater likelihood of not being dropped and/or late.

Alternatively, if a device in a VOIP call detects that fewer packets are being dropped, the device may attempt to take advantage of the increased available bandwidth by initiating the use of a different codec that compresses the data less. Thus, the communication data, when decoded at the destination, would contain more granular information about the audio/video being sent, and therefore the perceived quality of the call would increase.

There are some codecs that are variable bit rate (VBR). When these codecs are utilized, rather than the device changing the codec in response to changed network conditions, the device may change the ascribed bit rate of the VBR codec. The motivation and results of changing the bit rate for VBR codecs may be very similar to the motivation and results of changing the entire codec as described above.

However, when a codec changes, or when the ascribed bit rate of a VBR codec changes, it can be unclear how this change should affect calculations relating to the quality of the call, if it all. The embodiments herein relate to a method of calculating call quality when the codec or ascribed bit rate has changed during the call.

When analyzing the quality of a VOIP call, the mean opinion score (MOS) may be used. To get a true MOS for a call, each user of the VOIP call should be queried for their "opinion." However, there also exists at least one method for calculating an estimated MOS for each phone call. Per the International Telecommunication Union (ITU) Recommendation ITU-T G.107, published December 2011, the following equations may be used to calculate an estimated MOS:

$$MOS_{CQE} = 1 + 0.035R + R*(R-60)*(100-R)*(7*10^{-6}) \quad (1)$$

$$R = R_0 - Is - Id - I_{\textit{eff}} + A \quad (2)$$

$$Ieff = Ie + (95 - Ie) * \frac{PPL}{\left(\frac{PPL}{BurstR}\right) + BPL} \quad (3)$$

$$Ieff = Ie + (95 - Ie) * \frac{PPL}{PPL + BPL} \quad (4)$$

Per ITU-T G.107, PPL is the packet-loss probability, and BPL is the packet-loss robustness factor. The variables $I_e$ and BPL may be derived by using codec-specific values as supplied in Appendix I of ITU-T G.113 for several codecs. The variable "Is" represents the simultaneous impairment factor, and the variable "Id" represents delay impairment factor.

With respect Equation #3, in some situations, such as when packet loss is random, BurstR may be held to equal 1 (see ITU-T G.107, page 7), in which case, Equation #3 resolves to Equation #4.

One difference between the embodiments described herein and how the above equations may typically be used is that, in this disclosure, the $I_e$ value for a codec may be supplied by the $I_{e\text{-}\textit{eff}}$ of the previous codec.

Referring now to FIG. 1, a hardware diagram depicting a telephony monitoring system 100 in which the processes described herein can be executed is provided for exemplary purposes. In one example, as shown in FIG. 1, system 100 preferably includes telephony device 110 and server 120, wherein both telephony device 110 and server 120 preferably include monitoring engine 200. Monitoring engine 200 includes communications module 210, calculation module 220, and settings 230, wherein settings 230 preferably include codec 231 and ascribed bit rate 232.

Figure 2:
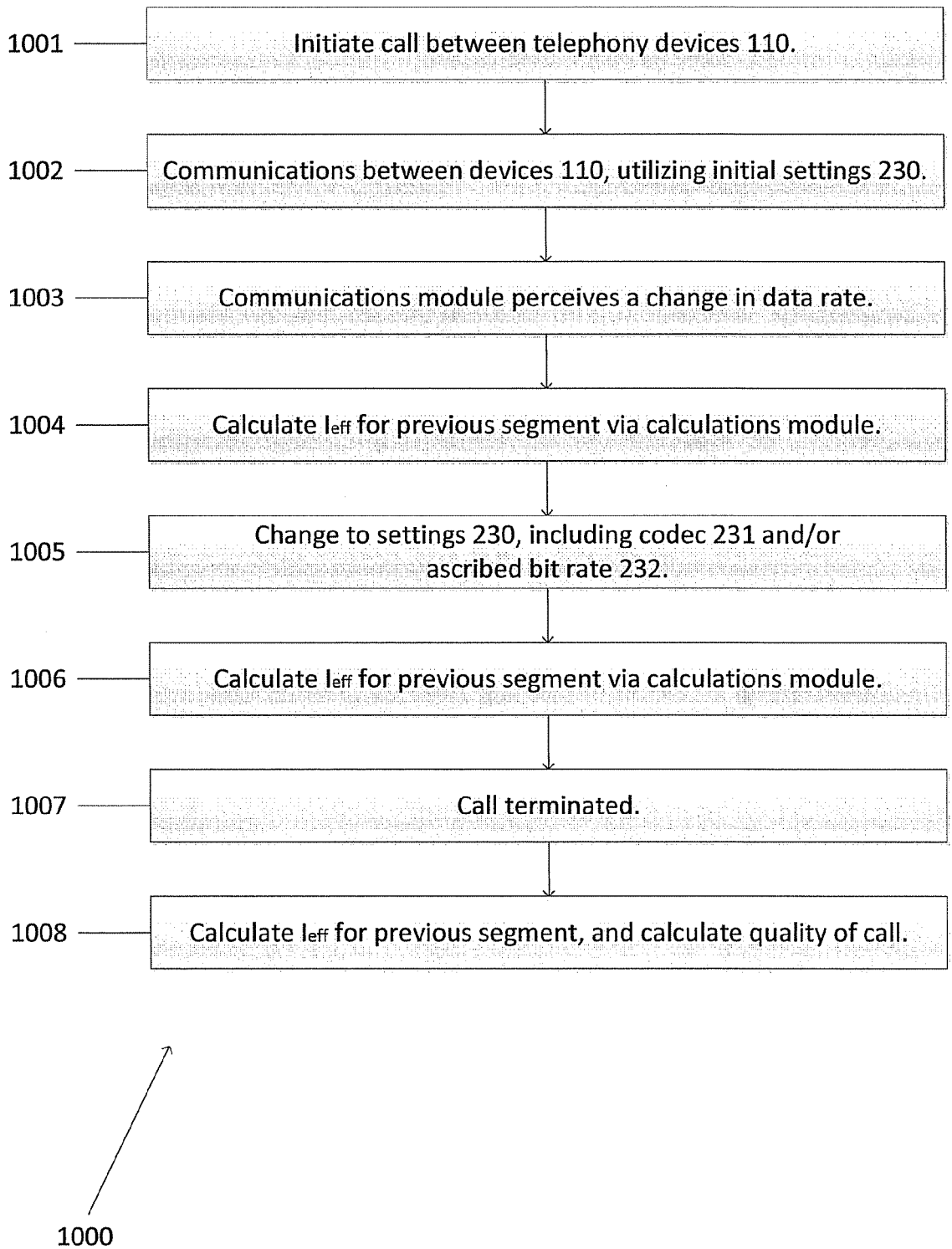
FIG. 2 is a flowchart that illustrates an exemplary process of calculating VOIP call quality according to the embodiment of FIG. 1.

Turning now to FIG. 2, displayed therein is an exemplary use 1000 of the embodiment shown in FIG. 1. Starting at step 1001, a VOIP call is initiated between telephony devices 110. In one embodiment, the VOIP call may involve communications directly between telephony devices 110 over network 50. Alternatively, the call may involve communications between each telephony device 110 and server 120, wherein server 120 functions as an intermediary between telephony devices 110.

Proceeding to step 1002, when the VOIP call is initiated, settings 230 are configured, wherein settings 230 includes codec 231. Sending device 110 utilizes codec 231 software to encode data before the data is communicated, and then receiving device 110 utilizes codec 231 to decode the data when received.

Communications module 210 of at least one device 110 perceives a change in the amount and/or speed that the data is being received (step 1003). In one situation, data in the call may have been initially received at device 110 well within standard parameters (i.e., a "gap"), and then device 110 may perceive that the data is slower to arrive (i.e., a "burst"). Thus, this transition would be a gap to burst transition. Alternatively, the perceived transition may be a burst to gap transition.

As can be found in existing literature, calculating the $I_{eff}$ for these transition periods may be performed using the following formulas:

$$Ieff(\text{burst} \to \text{gap}) = \quad (5)$$
$$Ieff(\text{burst}) - (Ieff(\text{burst}) - Ieff(\text{gap} \to \text{burst})) * e^{\wedge}\left(-\frac{b}{t1}\right)$$

$$Ieff(\text{gap} \to \text{burst}) = \quad (6)$$
$$Ieff(\text{gap}) + (Ieff(\text{burst} \to \text{gap}) - Ieff(\text{gap})) * e^{\wedge}\left(-\frac{g}{t2}\right)$$

The variables "b" and "g" are the duration of the burst or gap, respectively. The variable "t1" represents the time period between (1) when the quality of the call starts to improve, and (2) when the user perceives the quality of the call has improved. Generally, although not necessarily, this variable will be greater than zero seconds, such as, for exemplary purposes only, two seconds or five seconds. The variable "t2" represents the time period between (1) when the quality of the call starts to deteriorate, and (2) when the user perceives the quality of the call has deteriorated. Generally, although not necessarily, this variable will be greater than zero seconds, such as, for exemplary purposes only, two seconds or fifteen seconds.

Figure 3:
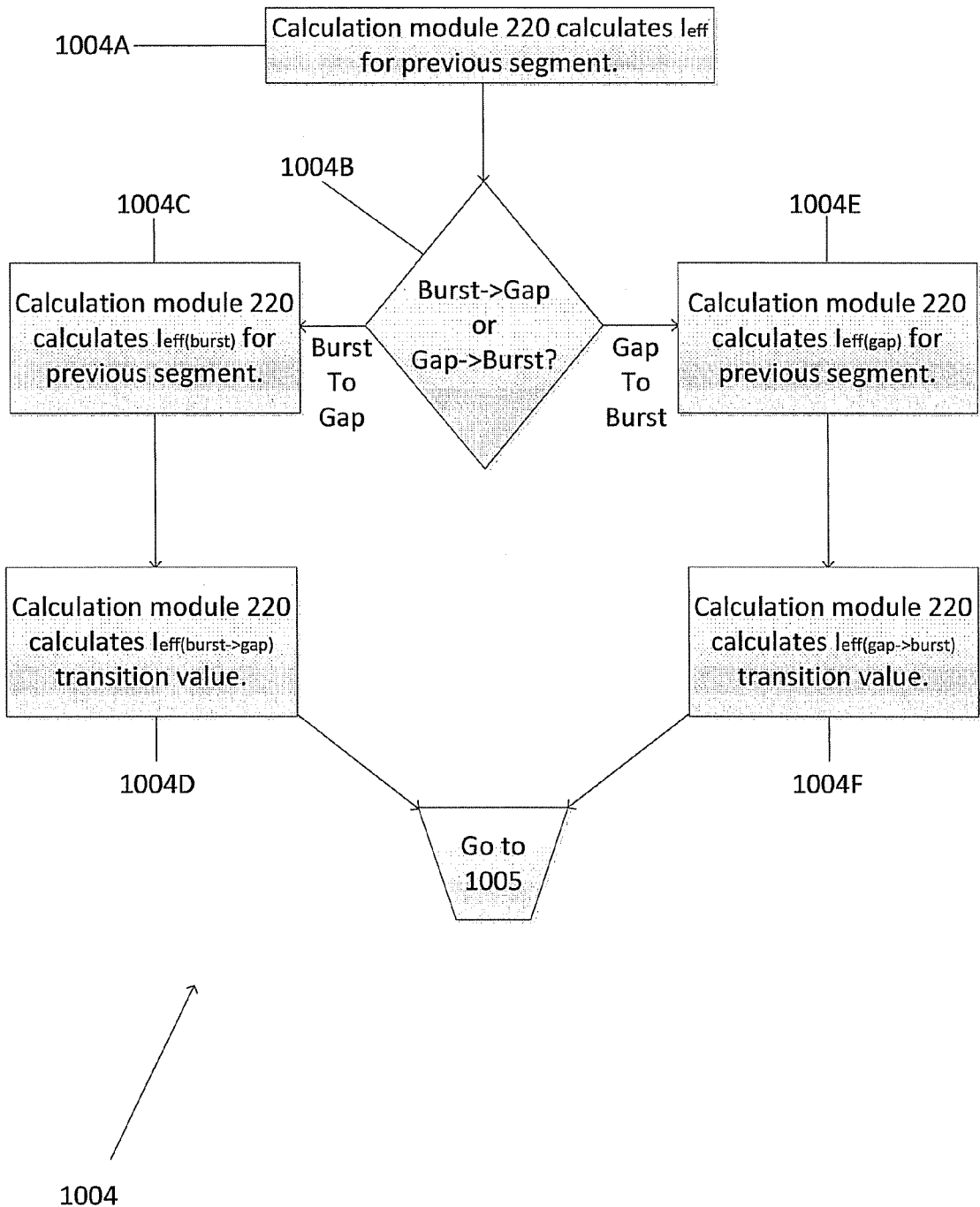
FIG. 3 is a flowchart that illustrates an exemplary process of calculating $I_{eff}$ for a previous segment of a VOIP call after the ascribed data rate changed.

Calculation module 220 calculates the $I_{eff}$ for the previous segment (step 1004). Turning now to FIG. 3, illustrated therein is an exemplary process of performing step 1004 of FIG. 2.

Communications module 210 informs calculation module 220 whether the transition detected was a burst to gap transition, or a gap to burst transition (step 1004B). If the transition detected was a burst to gap transition, method 1004 proceeds to step 1004C. Calculation module 220 calculates the $I_{eff(burst)}$ (step 1004C), and calculation module 220 calculates the $I_{eff(burst \to gap)}$ transition (step 1004D).

Alternatively, if the transition detected was a gap to burst transition, method 1004 proceeds to step 1004E. Calculation module 220 calculates the $I_{eff(burst)}$ (step 1004E), and calculation module 220 calculates the $I_{eff(burst \to gap)}$ transition (step 1004F).

It is noted herein, the first time either step 1004D or step 1004F is executed, $I_{eff(gap \to burst)}$ and $I_{eff(burst \to gap)}$ do not have values yet. Accordingly, the first time step 1004D or step 1004F is executed, the other transition value is held to be zero. More specifically, if step 1004D is executed first, when the $I_{eff(burst \to gap)}$ is calculated, the $I_{eff(gap \to burst)}$ transition value is held to be zero. Similarly, if step 1004F is executed first, when the $I_{eff(gap \to burst)}$ is calculated, the $I_{eff(burst \to gap)}$ transition value is held to be zero.

Returning to FIG. 2, settings 230 of the VOIP call may be modified, wherein the modification may be of codec 231 and/or the ascribed bit rate 232 (step 1005). Changing codec 231 typically involves substituting a new codec 231. Changing ascribed bit rate 232 involves modifying the selected bit rate, wherein the selected bit rate is an element of a variable bit rate (VBR) codec.

Figure 4:
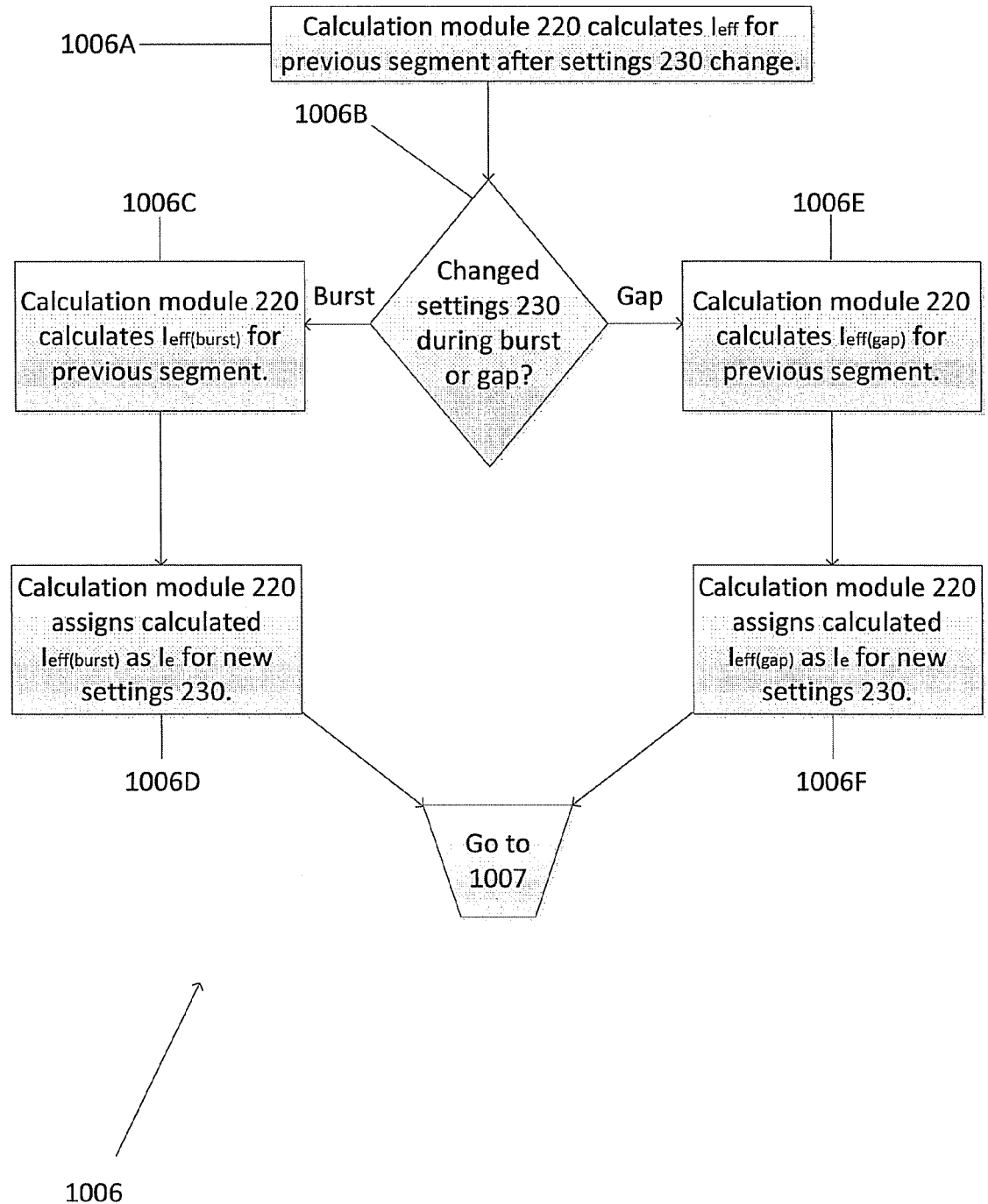
FIG. 4 is a flowchart that illustrates an exemplary process of calculating $I_{eff}$ for a previous segment of a call after the VOIP CODEC changed or VBR codec was modified.

The $I_{eff}$ is calculated by calculations module 220 for the segment before settings 230 was modified (step 1006). Turning now to FIG. 4, illustrated therein is an exemplary process of executing step 1006 in FIG. 2.

Communications module 210 informs calculation module 220 if settings 230 were changed during a burst or a gap (step 1006B). If settings 230 were changed during a burst, process 1006 continues to step 1006C; otherwise, process 1006 continues to step 1006E.

If settings 230 were changed during a burst, calculation module 220 calculates the $I_{eff(burst)}$ for the previous segment (step 1006C), and calculation module 220 assigns the just calculated $I_{eff(burst)}$ as the $I_e$ for the new settings 230 (step 1006D). Similarly, if settings 230 were changed during a gap, calculation module 220 calculates the $I_{eff(gap)}$ for the previous segment (step 1006E), and calculation module 220 assigns the just calculated $I_{eff(gap)}$ as the $I_e$ for the new settings 230 (step 1006F).

For example, if the VOIP calls transitions to the VSELP codec, rather than use a prescribed $I_e$ for calculations involving the VSELP codec, such as 20, which is found in Appendix I of ITU-T G.113, the $I_e$ used for calculating VSELP communications is the final $I_{eff}$ for the previous codec (calculated in step 1006C or step 1006E).

Similarly, if the bit rate for a VBR codec is amended, rather than use the $I_e$ of the new bit rate for that codec, the $I_e$ utilized is the final $I_{eff}$ for the previous bit rate for that codec (again, calculated in step 1006C or step 1006E).

The call is terminated (step 1007), and the $I_{eff}$ for the last segment is calculated (step 1008). Subsequently, the quality of the call is calculated, such as by using Equation #1 to calculate an average Mean Opinion Score (MOS) for the entire call. This will be a time-weighted average based on how long (1) each segment lasts, (2) how long each transition period lasted, and (3) how long each codec was active.

Figure 5:
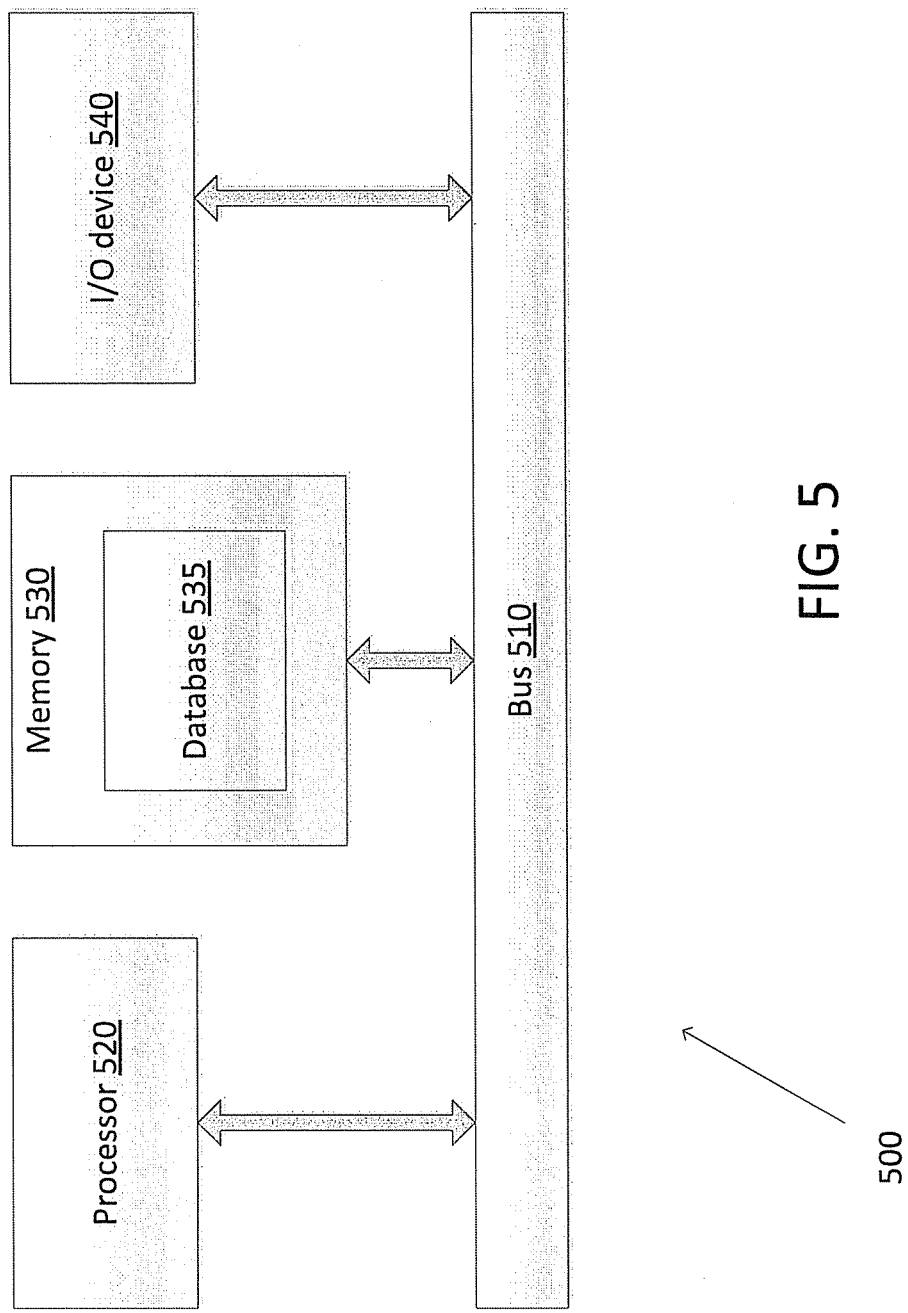
FIG. 5 illustrates an exemplary embodiment of a computing device as used in the embodiment of FIG. 1.

Turning to FIG. 5, illustrated therein is computing device 500 as may be used in the embodiment shown in FIG. 1. Telephony device 110 may include computing device 500, for example, but without limitation, if telephony device 110 is a desktop computer, laptop, tablet, or other electronic system. Similarly, server 120 may include computing device 500, computing device 500 having bus 510, processor 520, I/O device 540, and memory 530, wherein memory 530 includes database 535.

The term "module"/"engine" is used herein to denote a functional operation that may be embodied either as a standalone component or as an integrated configuration of a plurality of subordinate components. Thus, for example, monitoring engine 200 and calculation module 220 may be implemented as a single module or as a plurality of modules that operate in cooperation with one another. Moreover, although monitoring engine 200 and calculation module 220 are described herein as being implemented as software, they could be implemented in any of hardware (e.g. electronic circuitry), firmware, software, or a combination thereof.

Memory 530 is a computer-readable medium encoded with a computer program. Memory 530 stores data and instructions that are readable and executable by processor 520 for controlling the operation of processor 520. Memory 530 may be implemented in a random access memory (RAM), volatile or non-volatile memory, solid state storage devices, magnetic devices, a hard drive, a read only memory (ROM), or a combination thereof.

Processor 520 is an electronic device configured of logic circuitry that responds to and executes instructions. Processor 520 outputs results of an execution of the methods described herein. Alternatively, processor 520 could direct the output to a remote device (not shown) via network 50.

It is to be further appreciated that network 50 depicted in FIG. 1 can include a local area network (LAN) and a wide area network (WAN), but may also include other networks such as a personal area network (PAN). Such networking environments are commonplace in offices, enterprise-wide computer networks, intranets, and the Internet. For instance, when used in a LAN networking environment, the system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the system 100, or portions thereof, may be stored in a remote memory storage device such as storage medium. It is to be appreciated that the illustrated network connections of FIG. 1 are exemplary and other means of establishing a communications link between multiple computers may be used.

It should be understood that computing devices 500 each generally include at least one processor, at least one interface, and at least one memory device coupled via buses. Computing devices 500 may be capable of being coupled together, coupled to peripheral devices, and input/output devices. Computing devices 500 are represented in the drawings as standalone devices, but are not limited to such. Each can be coupled to other devices in a distributed processing environment.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention as defined by the appended claims.

What is claimed is:

1. A computer implemented method for determining call quality for a Voice Over IP (VOIP) communication after occurrence of VOIP communication setting changes, the method comprising the steps of:
  obtaining one or more measurements from a VOIP communication that is indicative of call quality;
  detecting a change of one or more settings of the VOIP communication during the VOIP communication and subsequent to obtaining the one or more call quality measurements, wherein the one or more settings of the VOIP communications are changed in response to changed network conditions;
  determining a state of the VOIP communication during the detected setting changes; and
  determining call quality of the VOIP communication after detection of the setting changes by utilizing at least one of the one or more call quality measurements based on the determined state of the VOIP communication, wherein utilizing the at least one of the call quality measurements comprises utilizing a first effective equipment impairment factor ($I_{e\text{-}eff}$) value of the VOIP communication that was obtained prior to the changing of one or more settings to determine a second $I_{e\text{-}eff}$ value for the VOIP communication occurring after the changing of the one or more settings.

2. The computer implemented method of claim 1, wherein the step of determining the VOIP call quality further comprises utilizing the first $I_{e\text{-}eff}$ value of the VOIP communication obtained prior to the changing of one or more settings as a base equipment impairment factor ($I_e$) value for determining the second $I_{e\text{-}eff}$ value for the VOIP communication occurring after the changing of the one or more settings.

3. The computer implemented method of claim 2 wherein the step of changing the one or more settings of the VOIP communication comprises changing at least one of a codec utilized for the VOIP communication and a bit rate of a Variable Bit Rate (VBR) codec utilized for the VOIP communication.

4. The computer implemented method of claim 3, wherein the changed network conditions comprise a transition from a burst to a gap, and wherein the method further comprises the steps of:
  determining a first $I_{(burst)}$ value for a segment prior to the burst to gap transition; and
  determining an $I_{(burst \rightarrow gap)}$ value for the burst to a gap transition.

5. The computer implemented method of claim 4, wherein the changed network conditions comprise a transition from a gap to a burst, and wherein the method further comprises the steps of:
  determining a second $I_{(burst)}$ value for the segment prior to the gap to burst transition; and
  determining an $I_{(gap \rightarrow burst)}$ value for the gap to burst transition.

6. The computer implemented method of claim 5 wherein the step of determining call quality of the VOIP communication utilizes a time-weighted average for each of the first and second calculated $I_{(burst)}$ values and the calculated $I_{(burst \to gap)}$ and $I_{(gap \to burst)}$ values upon termination of the VOIP communication.

7. A non-transitory computer readable storage medium and one or more computer programs embedded therein, the computer programs comprising instructions, which when executed by a computer system, cause the computer system to:
   obtain one or more measurements from a VOIP communication that is indicative of call quality;
   detect a change of one or more settings of the VOIP communication during the VOIP communication and subsequent to obtaining the one or more call quality measurements, wherein the one or more settings of the VOIP communications are changed in response to changed network conditions;
   determine a state of the VOIP communication during the detected setting changes; and
   determine call quality of the VOIP communication after occurrence of the setting changes by utilizing at least one of the one or more call quality measurements based on the determined state of the VOIP communication, wherein utilizing the at least one of the call quality measurements comprises utilizing a first effective equipment impairment factor $(I_{e\text{-}eff})$ value of the VOIP communication that was obtained prior to the changing of one or more settings to determine a second $I_{e\text{-}eff}$ value for the VOIP communication occurring after the changing of the one or more settings.

8. The non-transitory computer readable storage medium of claim 7, wherein the step of determining the VOIP call quality further comprises utilizing the first $I_{e\text{-}eff}$ value of the VOIP communication obtained prior to the changing of one or more settings as a base equipment impairment factor $(I_e)$ value for determining the second $I_{e\text{-}eff}$ value for the VOIP communication occurring after the changing of the one or more settings.

9. The non-transitory computer readable storage medium of claim 8 wherein the step of changing the one or more settings of the VOIP communication comprises changing at least one of a codec utilized for the VOIP communication and a bit rate of a Variable Bit Rate (VBR) codec utilized for the VOIP communication.

10. The non-transitory computer readable storage medium of claim 9, wherein the changed network conditions comprise a transition from a burst to a gap, and wherein the method further comprises the steps of:
   determining a first $I_{(burst)}$ value for a segment prior to the burst to gap transition; and
   determining an $I_{(burst \to gap)}$ value for the burst to a gap transition.

11. The non-transitory computer readable storage medium of claim 10, wherein the changed network conditions comprise a transition from a gap to a burst, and wherein the method further comprises the steps of:
   determining a second $I_{(burst)}$ value for the segment prior to the gap to burst transition; and
   determining an $I_{(gap \to burst)}$ value for the gap to burst transition.

12. The non-transitory computer readable storage medium of claim 11 wherein the step of determining call quality of the VOIP communication utilizes a time-weighted average for each of the first and second calculated $I_{(burst)}$ values and the calculated $I_{(burst \to gap)}$ and $I_{(gap \to burst)}$ values upon termination of the VOIP communication.

13. A processor implemented method for determining call quality for a Voice Over IP (VOIP) communication after occurrence of VOIP communication setting changes, the method comprising the steps of:
   obtaining, on a telephony device with a processor, one or more measurements from a VOIP communication that is indicative of call quality;
   detecting a change, on the telephony device, of one or more settings of the VOIP communication during the VOIP communication and subsequent to obtaining the one or more call quality measurements, wherein the one or more settings of the VOIP communications are changed in response to changed network conditions;
   determining a state of the VOIP communication during the detected setting changes; and
   determining, on the telephony device, call quality of the VOIP communication after detection of the setting changes by utilizing at least one of the one or more call quality measurements based on the determined state of the VOIP communication, wherein utilizing the at least one of the call quality measurements comprises utilizing a first effective equipment impairment factor $(I_{e\text{-}eff})$ value of the VOIP communication that was obtained prior to the changing of one or more settings to determine a second $I_{e\text{-}eff}$ value for the VOIP communication occurring after the changing of the one or more setting.

* * * * *